United States Patent [19]

Hinks

[11] 3,781,798
[45] Dec. 25, 1973

[54] MECHANICAL READING OF TIRE IDENTIFICATION SYMBOLS
[75] Inventor: William L. Hinks, Akron, Ohio
[73] Assignee: The Goodyear Tire & Rubber Company, Akron, Ohio
[22] Filed: Dec. 20, 1971
[21] Appl. No.: 209,610

[52] U.S. Cl.... 340/146.3 R, 152/330, 235/61.11 C, 235/61.11 J, 336/136
[51] Int. Cl. ............................................. G06k 7/04
[58] Field of Search.................. 152/330, 361, 362; 235/61.11 R, 61.11 B, 61.11 C, 61.11 J; 336/131, 136, 45; 340/149 A, 339

[56] References Cited
UNITED STATES PATENTS

| 3,671,717 | 6/1972 | Bieser | 340/146.3 Z |
| 3,225,810 | 12/1965 | Enabnit | 152/330 |
| 3,366,906 | 1/1968 | Perkins | 336/136 |
| 3,671,720 | 6/1972 | White et al. | 235/61.11 C |
| 3,435,446 | 3/1969 | Margolien et al. | 340/347 P |
| 3,233,647 | 2/1966 | Newell | 152/330 |

Primary Examiner—Maynard R. Wilbur
Assistant Examiner—Leo H. Boudreau
Attorney—F. W. Brunner et al.

[57] ABSTRACT

Method and apparatus for mechanically reading alpha numeric symbols in the identification code of a pneumatic tire. The apparatus includes a plurality of closely spaced individually movable fingers urged by air pressure toward the surface of a tire on which such symbols are placed. Upon relative movement between the tire surface and the fingers, the individual fingers are deflected by the local topography of the symbols. The deflections are transduced by linear differential transformers connected individually to the fingers and produce deviation signals which can be communicated to conventional character recognition equipment for indication, display, or recording.

The foregoing abstract is not to be taken as limiting the invention of this application, and in order to understand the full nature and extent of the technical disclosure of this application, reference must be made to the accompanying drawing and the following detailed description.

11 Claims, 4 Drawing Figures

PATENTED DEC 25 1973 3,781,798
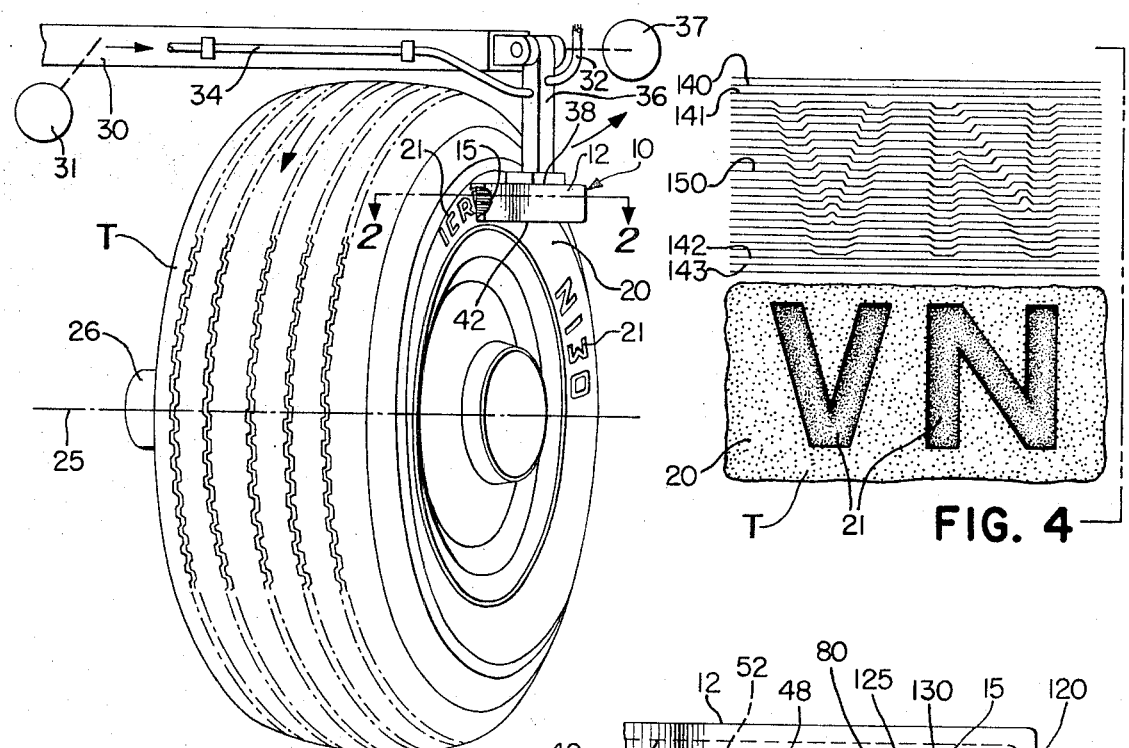
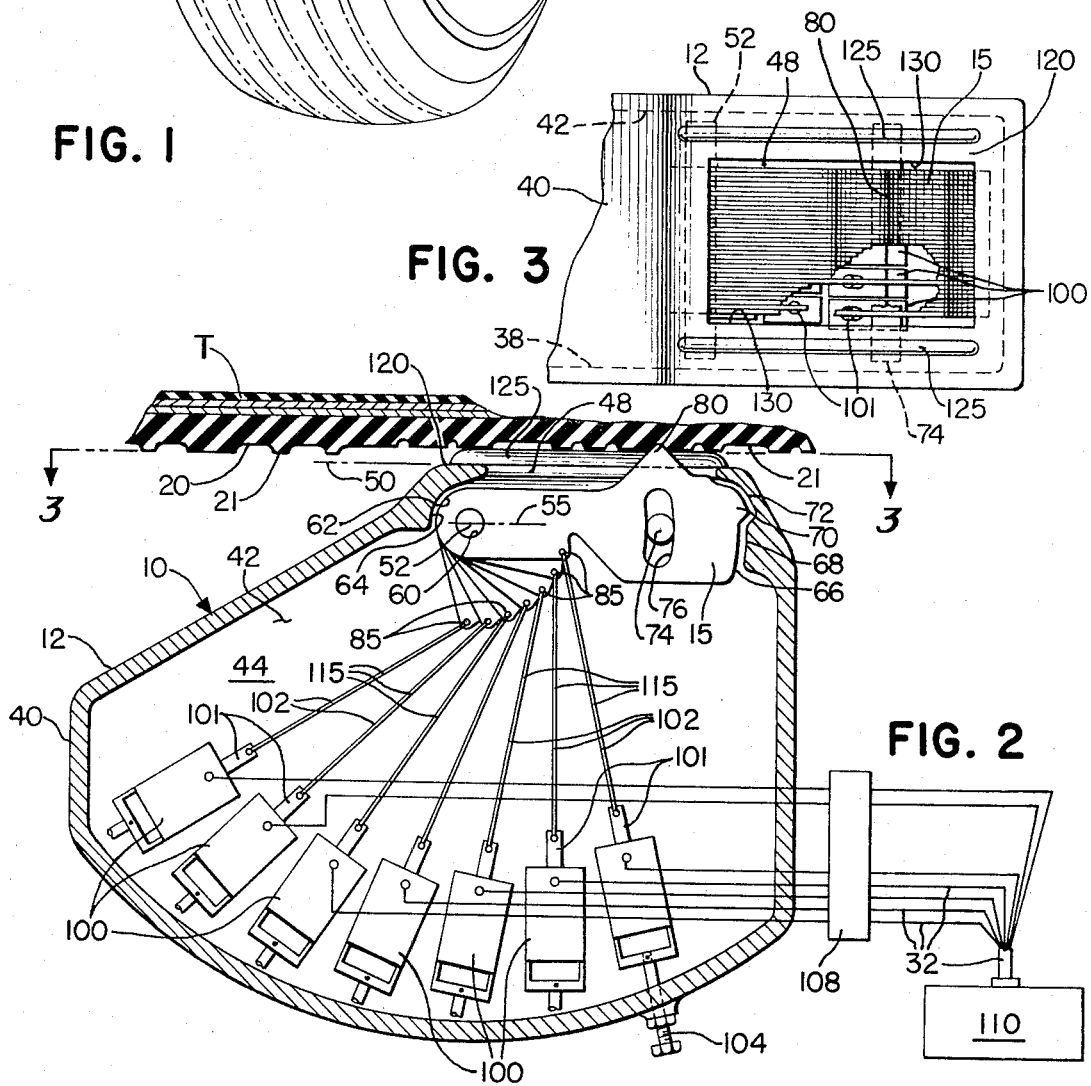
FIG. 1
FIG. 4
FIG. 3
FIG. 2

MECHANICAL READING OF TIRE IDENTIFICATION SYMBOLS

This invention relates to mechanical reading of alpha numeric characters, symbols, and similar topographic features formed on or in the surface of pneumatic tires for tire identification. More particularly, the invention relates to a method and apparatus for generating a plurality of signals which in combination are respresentative of individual characters or symbols of which the identification code on the tire is composed.

It is well known to mark individual tires with letters, numbers, and other symbols representative of particular features of a tire or series and by which such tire or series of tires can subsequently be identified. Recently it has become necessary to provide such code markings for tires sufficiently detailed to permit not only the customary remedial action in the event of a fault in such tire but also to record and inform a central agency of the identity of each particular tire purchased, as well as of the ownership of the final purchaser and user, in sufficient detail so that such purchaser or user can later be informed individually that a particular tire or series of tires might possibly be subject to a possibility of future failure. This requirement results in a substantial increase in cost for each tire delivered to the final purchaser and is an element of cost which that purchaser may be unwilling or unable to pay.

This invention aims, therefore, to reduce insofar as possible the costs of reading and recording a tire identification code from an individual tire.

A further object of the invention is mechanically to sense individual alpha numeric characters or symbols composing a tire identification code and to generate signals representative of each character or symbol in their proper sequence such that the signals can be processed by conventional pattern or character recognition equipment.

The foregoing and other objects and advantages which will become apparent or be particularly pointed out in the description which follows are accomplished in accordance with the invention by a method comprising engaging surface contact with each other the character bearing surface of the tire and a sensor having a plurality of closely spaced movably mounted fingers, effecting relative movement between the tire and the sensor in a direction parallel to said surface, displacing the fingers in said sensor individually relatively of said surface in response to the respective profiles of depressions or elevations encountered by the fingers during the relative movement, and generating a plurality of signals associated respectively with the displacements of each of said fingers.

Broadly stated, apparatus in accordance with the invention includes a tire identification code sensing device, for use in association with pattern or character recognition means, to read mechanically the successive symbols composing a tire identification code, which device comprises a plurality of fingers mounted in closely spaced array, each finger being movable independently relative to the others, motion transducing means connected respectively to each said finger and operative to generate a signal in response to a deflection of the respectively connected finger.

A presently preferred embodiment of the invention claimed herein together with a preferred manner and process of practicing the same will be described with reference to the attached drawings in which:

FIG. 1 is a pictorial representation of a device according to the invention disposed in operative relation to a tire having an identification code which is desired to be read mechanically;

FIG. 2 is an enlarged and partially schematic view of the sensing device and the tire as seen on line 2—2 of FIG. 1, parts being removed or broken away to show features of the device;

FIG. 3 is a view as indicated by the lines 3—3 in FIG. 2;

FIG. 4 is a schematic representation of the signals from the device shown with typical symbols carried by a tire, which signals can be communicated to conventional character recognition means.

Referring to the drawings and particularly to FIG. 1, a sensing device 10 in accordance with the invention comprises a hollow body or housing 12 within which are mounted a plurality of sensing fingers 15, better illustrated in FIGS. 2 and 3. The device 10 is disposed in operative relation with the surface 20 of the tire T which bears the identifications code 21. The tire is mounted on suitable means for rotation about its own axis 25, which means may provide power to rotate the tire. Alternatively, the tire may be rotated by hand. The tire can be mounted on mounting means 26 specifically for the purpose or, with equal facility, can be mounted upon a vehicle in the usual manner. In the latter case, a significant advantage stemming from the invention is that the identity of the four or more tires associated with such vehicle can be directly and mechanically recorded for or directly in the documents which must accompany that vehicle.

The sensing device 10 is carried by means for moving the device into operating position with respect to the tire and for moving the device away from the tire to a parked position where it will not interfere whith the mounting and/or removal of the tire from the mounting means.

The device 10 itself can, of course, be moved along the surface 20 while the tire T remains stationary. It is within the contemplated scope of this invention that the device 10 be hand-held and manipulated. As will be explained further hereinbelow, the sensing device comprises a plurality of closely spaced and movably mounted fingers 15 each of which is individually displaced in response to the depressions or elevations which each particular finger encounters as they are moved over the characters composing the code 21.

For purposes to be explained presently, the means for moving the device includes an arm 30 having a stem 36 pivotably connected thereto which accommodates a multiple conductor cable 32 and a flexible air hose 34 connected to, and extending through, to the upper sidewall 38 of the device. The connection with the cable 32 will be described presently. The air hose 34 is connected to supply compressed air into the housing 12 as will also be described. Means for moving the arm 30 and/or the stem 36 are illustrated respectively by the motors 31 and 37 connected to move the device 10 between its operating position and a parked position clear of the tire.

Turning to FIGS. 2 and 3, the housing 12 of the device is formed of a peripheral wall 40, the shape of which is best illustrated in FIG. 2, and the sidewalls 38,42 which are joined to the peripheral wall to form a chamber 44 within the housing.

A rectangular opening 48 in the housing defines a reference plane 50 which, in the use of the device, is coincident with or closely parallel to the surface 20 of the tire.

A pivot shaft 52 fixed in the respective sidewalls 38,42 extends parallel to the reference plane 50 and supports for pivotal movement a plurality of the individual fingers 15 for movement normal to the reference plane 50. The individual fingers are formed of thin (about 0.015 inch in the device 10) steel or other rigid material and are closely spaced side by side, as may be seen in FIG. 3. The fingers advantageously are individually coated or covered with Teflon or the like to minimize the effect of friction of possible contact between the fingers. Contact between the adjacent fingers 15 is minimized as is friction therebetween by a flow of air around and between them, as will be presently apparent in more detail. The array of fingers may include any number of individual fingers sufficient in combination to span the code 21 on the tire transversely of the direction of relative movement therebetween, and to trace a sufficient number of profiles to discriminate among the characters or topographic features to be read. In the device 10, 32 fingers are satisfactory. The longitudinal dimension of the respective fingers 15, as measured in the direction represented by the reference line 55 is approximately parallel to the reference plane 50. Each finger is provided with a mounting hole 60 for accomodating the shaft 52. The arcuate end surface 62 of each finger 15 is concentric about the hole 60 and the shaft 52 and coooperates with the housing inner surface 64 to form a narrow passage for air flow. The fingers 15 each terminate in an arcuate surface 66 also concentric with the hole 60 which similarly cooperates with the housing surface 68 to form a narrow passage for air flow.

In order to limit the arcuate movements of each of the individual fingers 15 about the shaft 52, each is provided with a lug 70 which extends into a transverse slot 72 formed in the housing surface 68 such that the lug strikes the respective sides of the slot to limit the arcuate travel of the individual finger. Alternatively, to limit the swing of the individual fingers, a stop pin 74 is fixed in the sidewalls 38,42 parallel to the reference plane 50 and extends through arcuate slots 76 formed in each finger. The movement of the fingers is thus limited but is sufficient to permit the individual fingers to be displaced relatively normal to the plane 50 to trace the transverse profiles of characters raised above or depressed below the surface 20. The total movement of each finger normal to the plane 50 is sufficient to exceed the height or depth of the characters relative to the surface 20.

The edges of the fingers nearer to the plane 50 each have a surface engaging tip 80 projecting outwardly of the opening 48 to trace a line profile of the sequence of characters and of the tire surface. The symbols, characters, or other topographic features of the tire to be read can be indented or depressed in the surface 20 of the tire, or on the other hand, can be raised on the surface. With either form of character or symbol, however, the finger tips 80 each have sufficiently small longitudinal dimensions so as to follow the surface profile of the line traced by the particular finger. To this end, the projections have included angles of about 90° and apex radii of about 0.015 inch. As will be readily understood, it is advantageous to coat at least the apex radius or otherwise harden its surface to increase its wear life.

The inwardly facing edges of each of the fingers is provided with a pin connection 85. In successively juxtaposed fingers 15, the respective pin connections 85 are spaced radially equally from the pivot shaft 52 and at successively greater angles with respect to the reference line 55. In the device illustrated, the pin connections 85 in respectively juxtaposed fingers are spaced at approximately 12° of arc in the set of seven fingers. The total number of fingers provided can be thus grouped into sets of or partial sets of, for example, 6, 7, or 8 fingers. As will be appreciated, the thickness (about 0.015 inch) of the fingers is less than the motion transducers to which they are to be connected. The groups of fingers as described permit accommodation of relatively much thicker transducers.

To convert the displacements of the individual fingers 15 into signals which can be transmitted to character recognition equipment, the device 10 includes transducer means in the form of a plurality of commercially available linear differential transformers 100 disposed in a generally arcuate array in one or more sets or partial sets corresponding to the sets of the fingers 15. In each of the transformers 100, a core 101 is movable along a line termed herein a line of action 102 and each transformer is mounted within the housing so that its line of action extends through the respectively associated pin connection 85, all of which lines are spaced equally from the pivot shaft 52. The location of the transformer 100 along its line of action 102 may be adjusted by an adjustment screw 104, only one of which is shown, extending through the peripheral wall 40. The respective windings of the individual transformers 100 are connected appropriately through signal demodulators 108 to convert the A C signals of the transformer to D C signals by way of the conductors of the multiplex cable 32, previously mentioned, so that the signals emitted from the respective trans-formers and suitably converted are communicated to a conventional minicomputer 110, such as a model PDP/8, marketed by the Digital Equipment Corporation, Maynard, Massachusetts, which is in a known manner programmed to perform character recognition functions.

For communicating the particular displacements of the individual fingers to the respectively associated transformer core 101, a plurality of struts 115 are connected repectively at one end to each pin connection 85 and at the other end to the associated transformer core 101. The struts 115 are provided with pivotable connections at each end or alternatively can be fixed at each end, the struts 115 then being flexible at the respectively connected ends.

As may be seen in FIG. 2, each differential transformer core 101 will be displaced proportionately by any displacement of the respectively associated finger 15. Thus, when so displaced, the individual transformers will each emit signals in the form of changes in voltage and current which signals are representative of the profile traced by the particularly associated individual finger during relative movement between the device 10 and the tire surface 20.

The displacements of the individual fingers may be converted to signals by transducers other than the linear differential transformers 100. Advantageously, the signals produced by the motion transducer selected are of a continuous and variable output as distinguished form the on/off type of signal. The displacement of all of the fingers, relative to the reference plane 50, in the device merely changes the reference value with respect to which the individual displacement signals are compared. Thus, there being no dead zone, the spacing between the housing surface 120 and the tire surface is not particularly critical. Contacting ridges 125 by which the device is located with respect to the surface 20 can be provided to facilitate the reading of raised characters, if desired, but are not required for reading only characters depressed in the surface.

In order to urge the fingers 15 outwardly of the housing 12 toward the tire surface, the chamber 44 is supplied with a sufficient flow of compressed air to maintain therein a pressure above atmospheric, at an internal pressure of from a few ounces per square inch to several pounds per square inch, depending on the particular construction and use of the device. It will be recalled that the ends 62 and 66 of the fingers 15 are positioned closely to the respective surfaces 64 and 68 of the housing located at the ends of the rectangular opening 48 therein. The laterally outermost fingers of the total array are also spaced only slightly from the sides 130 of the opening 48. The fingers 15, as has been mentioned, are also closely spaced one to another. The rectangular opening 48 is thus closed by the array of fingers 15 except for the orifices provided by the narrow spacing at the perimeter of the array of fingers 15 and in the spaces therebetween. As the chamber 44 is supplied with air pressure, a small flow of air is permitted to escape around and between the fingers. The pressure within the chamber 44, outward flow being limited by the narrow passages, acts to urge the fingers outwardly to maintain contact between the projection tips 80 and the tire surface 20. The flow of air also serves to prevent dust and such foreign material from entering the housing as well as to purge the opening and the adjacent surfaces of the tire from loose dust and the like.

Referring to FIG. 4; two characters V and N typical of characters or symbols forming a code on the T are illustrated in the lower part of the view, while in the upper part, the horizontal lines represent schematically all the paths traced by the respective fingers during relative movement of the device and the tire surface. The lines also represent the signals produced by the respective transformers 100 as the particular paths are traced. The horizontal lines 140, 141, 142, 143 represent schematically the paths traced by fingers disposed outwardly of the characters such that the fingers are not displaced relative to the others or deflected by the characters. The line 150, for example, representing the path of an intermediate finger, as well as the signals from the associated transformer, is displaced relative to the others (inwardly or outwardly relative to the plane 50) by the engagement of the particular finger with successive portions of the profiles of the characters V and N. The displacement of the associated finger moves the strut 115 and the core 101 associated therewith, thus generates in the transformer 100 a change in output (increase or decrease, respectively), which is carried by the cable 32 to the computer 110.

Because movement of the device 10 initially into contact with the tire surface 20 results in an initial displacement of all of the fingers 15, the signal generated therefrom can readily be employed to activate means for rotating the tire, or with equal facility, means for stopping movement of the arm 30 and/or the stem 36 so as to hold the device 10 in operative proximity to the tire surface 20.

The practice of the invention has particular utility in connection with tires for automobiles. It will be fully apparent that the principles illustrated by the foregoing description are not limited in application or utility only to such tires, nor only to identifying characters thereon. Methods and apparatus in accordance with the invention can be used as well in detecting manufacturing flaws and irregularities which alter the surface topography of a tire, and can be used in reading markings and topographic features of other articles as well.

The operation of the device will be fully apparent to persons skilled in the pertinent arts without further description. Likewise, the method in accordance with the invention is fully shown by the foregoing description.

While certain representative embodiments and details have been shown for the purpose of illustrating the invention, it will be apparent to those skilled in the art that various changes and modifications may be made therein without departing from the spirit or scope of the invention.

What is claimed is:

1. A method of reading mechanically successive symbols composing an identification code on a tire comprising engaging in surface contact with each other the code bearing surface of such tire and a sensor having a plurality of closely spaced movably mounted fingers, said fingers being disposed within a rigid hollow body having an aperture accommodating said fingers and geometrically similar in shape with the shape of the perimeter of the plurality of fingers, applying a pressurized gas to urge said fingers individually outwardly of said aperture, effecting relative movement between said surface of the tire and the sensor in a direction parallel to said surface to effect displacement of said fingers individually relatively of the surface in response to depressions or elevations encountered by the respective fingers during the relative movement, generating electrical signals in response to the displacements individually thereof, and communicating said signals to a pattern or character recognition means to read mechanically the successive symbols composing the code.

2. The method as claimed in claim 1, including flowing a fluid from within the sensor outwardly along the surfaces of said fingers.

3. The method as claimed in claim 1, said step of engaging including mounting said tire for rotation about its own rotational axis and moving one of said tire and said sensor to operative proximity with the other.

4. The method as claimed in claim 3, further comprising actuating movement of at least one of said sensor and said tire in response to a displacement of at least one of the fingers by said tire.

5. A tire identification code sensing device for use in association with pattern or character recognition means to read mechanically the successive symbols composing the code, said device comprising a plurality of fingers mounted in closely spaced array, a rigid hollow body disposed about said fingers and provided with an aperture having a perimeter geometrically similar in shape with the shape of the perimeter of said array of fingers in the plane of said aperture, a narrow passage for flow of gas defined by and between the perimeters of said array and said aperture, said fingers having tire surface engaging elements extending outwardly of said body through said aperture, each finger being movable independently relative to the others in parallel directions normal to a common plane, motion transducing means connected respectively to each said finger and operative to generate a signal in response to a deflection of a respectively connected finger, and including means for applying a fluid pressure differential to each said finger to urge said fingers toward said plane.

6. Apparatus as claimed in claim 5, comprising shaft means mounting said fingers in parallel side-by-side array for angular movement of each of said fingers independently of the others of said fingers about said shaft means.

7. Apparatus as claimed in claim 6, including stop means associated with each finger to limit said angular movement thereof.

8. Apparatus as claimed in claim 7, each finger having an opening extending transversely therethrough and said stop means comprising a bar fixed in said body and extending through the respective openings of each of said fingers.

9. Apparatus as claimed in claim 5, said motion transducing means comprising a plurality of differential transformers mounted on said body, and a movable core of each of said transformers being connected coaxially of said transformer to a respective finger.

10. Apparatus as claimed in claim 9, said transformers being mounted for adjustment each along its own axial direction.

11. Apparatus as claimed in claim 6, said transducing means each having an element movable along a line of action, each of said fingers having pin connecting means spaced angularly with respect to pin connecting means of a juxtaposed one of said fingers, said transducing means being disposed in arcuately spaced apart relation such that the respective lines of action thereof are disposed at equal distances from said shaft means, and a plurality of struts each connected to one of said pin connecting means and to the respectively associated movable element and extending along the line of action thereof.

* * * * *